US010654420B2

(12) United States Patent
Levi

(10) Patent No.: US 10,654,420 B2
(45) Date of Patent: *May 19, 2020

(54) TILTABLE LADDER RACK

(71) Applicant: ROM ACQUISITION CORPORATION, Belton, MO (US)

(72) Inventor: Avraham Y. Levi, Eagan, MN (US)

(73) Assignee: ROM ACQUISITION CORPORATION, Belton, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/101,053

(22) Filed: Aug. 10, 2018

(65) Prior Publication Data

US 2018/0345871 A1 Dec. 6, 2018

Related U.S. Application Data

(63) Continuation-in-part of application No. 15/919,749, filed on Mar. 13, 2018, now Pat. No. 10,486,608.

(60) Provisional application No. 62/470,477, filed on Mar. 13, 2017.

(51) Int. Cl.
*B60R 9/042* (2006.01)
*A62C 33/04* (2006.01)
*B60P 3/40* (2006.01)

(52) U.S. Cl.
CPC ............ *B60R 9/0423* (2013.01); *A62C 33/04* (2013.01); *B60P 3/40* (2013.01)

(58) Field of Classification Search
CPC . E06C 5/02; E06C 5/24; B60R 9/0423; B60R 9/042; B60R 9/0485; B60R 2011/0028; B60P 3/1008; B60P 3/1025; B60P 3/1016; B60P 1/52; A62C 31/28; Y10T 292/0917
See application file for complete search history.

(56) References Cited

U.S. PATENT DOCUMENTS

| | | | | |
|---|---|---|---|---|
| 3,843,001 | A | * 10/1974 | Willis | ..................... B60P 3/122 414/462 |
| 4,348,054 | A | * 9/1982 | Shonkwiler | .......... B62D 53/062 298/11 |
| 5,423,650 | A | 6/1995 | Zerbst et al. | |
| 7,513,730 | B2 | 4/2009 | Goyanko | |
| 2006/0076189 | A1 | 4/2006 | Ziaylek et al. | |

(Continued)

*Primary Examiner* — Gregory W Adams
(74) *Attorney, Agent, or Firm* — DeWitt LLP; Thomas J. Nikolai

(57) ABSTRACT

A ladder rack assembly for a work vehicle has a stationary bed for attachment to the roof thereof. A pair of parallel, spaced apart rails has guides thereon that extend from the rails' first ends toward, but short their second ends. Rollers on side edges of a load support member ride on the bed rails. When the rollers are constrained by the guides, only translation of the load support member takes place. Upon exit of the rollers from the rear ends of the guides, both translation and rotation of the load support member can occur. A control arm is pivotally joined at one end to the stationary bed. Its free end has cam actuated latch pin assemblies attached to it that co-act with cams on the stationary bed during rearward displacement of the load support member to latch the load support member to the control arm whereby further rearward movement of the load support member causes it to tilt to a somewhat vertical position.

16 Claims, 24 Drawing Sheets

(56) References Cited

U.S. PATENT DOCUMENTS

2007/0240936 A1 10/2007 Brookshire, Jr. et al.
2011/0038698 A1 2/2011 Li
2012/0263561 A1 10/2012 Li

* cited by examiner

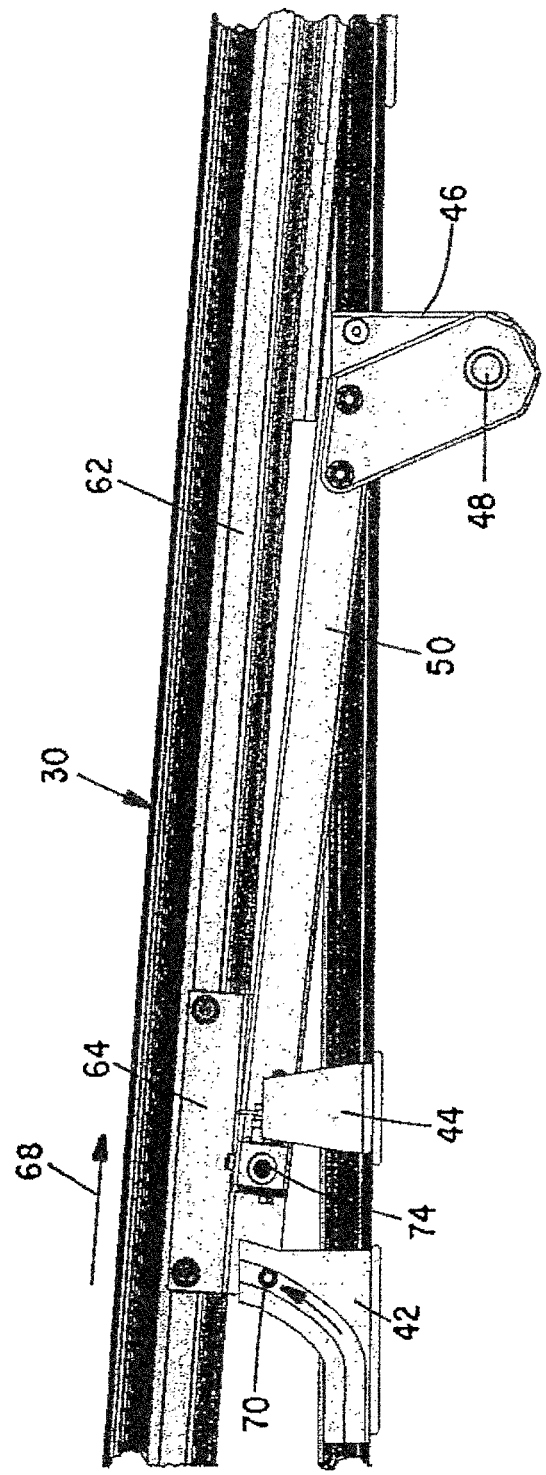

TILTABLE LADDER RACK

CROSS-REFERENCED TO RELATED APPLICATIONS

This application is continuation-in-part of Ser. No. 15/919,749 filed Mar. 13, 2018 which claims priority to provisional Application No. 62/470,477, filed Mar. 13, 2017, each of which is also deemed incorporated by reference in its entirety in this application.

STATEMENT REGARDING FEDERALLY SPONSORED RESEARCH OR DEVELOPMENT

Not applicable

BACKGROUND OF THE INVENTION

I. Field of the Invention

This invention relates generally to the design and construction of vehicle ladder racks, and more particularly, to an improved ladder rack that facilitates the loading and unloading of ladders on and from the roofs of commercial vans and other types of work vehicles while standing at the rear of the vehicle.

II. Discussion of the Prior Art

For the past twenty years or more, I have worked as a designer of ladder rack systems and have been awarded the below-listed U.S. patents on various improvements I have made to the above field:

U.S. Pat. Nos. 5,297,912; 6,092,972; 6,099,231; 6,427,889; 6,764,268; 6,971,563; 8,511,525; 8,857,689; 8,991,889, 9,415,726; 9,481,313; 9,481,314; and 9,506,292.

For the most part, the ladder racks involved in these patents, as well as others in the prior art, have utilized a lever to simultaneously rotate front and rear 4-bar linkages to transfer ladders from a position atop a work vehicle to a location along the side of the vehicle where a worker can readily grasp the ladder and carry it to the work site. I have now invented a ladder rack that operates on an altogether different principle.

Instead of relying on a rotational force on a crank or lever to transfer a ladder load from atop a roof of a vehicle to a position along the vehicle's side, my new ladder rack of the present invention provides a slide arrangement that allows the worker to either manually or automatically move the ladder load horizontally along the vehicle's roof for a predetermined distance and then have it shift to a somewhat vertical disposition at a location where the ladders and the slide mechanism will not come into contact with the vehicle's body. When in the vertical position, ladders can readily be removed by a person standing on the ground at the rear of the vehicle. Likewise, ladders can be easily reloaded onto the slide mechanism and then manually or automatically lifted and transferred back to a horizontal orientation on the vehicle's roof.

SUMMARY OF THE INVENTION

The present invention comprises a stationary bed member adapted to be firmly affixed to a vehicle's roof aligned with the longitudinal axis of the vehicle. The bed member comprises a pair of rectilinear rails which preferably are elongated tubes of rectangular cross-section that are held in parallel, spaced-apart relation by at least one transversely extending cross-member. Affixed to each of the rails and extending from the rails front ends approximately halfway along the length dimension thereof are a pair of elongate guide members of a generally C-shaped cross-section in which rollers affixed to a load support member are constrained such that the load support member can only move along the rails horizontally in translation without rotation for a predetermined distance determined by the length dimension of the guide members and the placement of the rollers on the load support member.

Affixed to the under surface of the stationary bed proximate its rear end are first and second bracket pairs between which a control arm and a support arm are pivotally connected. In one embodiment, at the free end of the control arm is a cam follower roller and, as the load support member moves to a point where the guide rollers leave the guide sleeves, the cam follower roller enters a cam track on a first cam member affixed to the stationary bed. With rearward movement of the load support member, the cam follower roller elevates and thereby lifts the control arm to a point where a second cam member actuates a spring-loaded, cam-actuated locking pin that acts to latch the control arm to a latch bracket affixed to the underside of the load support member. Once so latched, the control arm causes the load support member to pivot about the support arm with continued movement of the slide member. It ultimately tilts the load support member to a somewhat vertical disposition while clearing the body of the vehicle on which the present invention is mounted. When in the tilted position, ladders or other load items affixed to the load support member are easily reached by a worker standing on the ground at the rear of the vehicle.

To return the load support member to its horizontal disposition on the roof of the vehicle, the worker merely lifts the lower end of the load support member until it is generally horizontal and with a slight forward pushing force, a point is reached where the second cam causes the spring-loaded latch that couples the control arm to the load support member to be released and the rollers on the load support member to again enter the horizontal roller guides on the stationary bed.

The present invention also shows a motor drive mechanism attachable to the ladder rack assembly for providing a linear drive to the load support member for providing automatic operation of the ladder rack.

BRIEF DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts:

FIG. 5B is a view like FIG. 5A, but with the cam follower roller affixed to the latch plate further elevated to a point where an arm lock cam begins to engage a spring-loaded, cam-actuated latch;

DESCRIPTION OF THE PREFERRED EMBODIMENT

Figure 1:
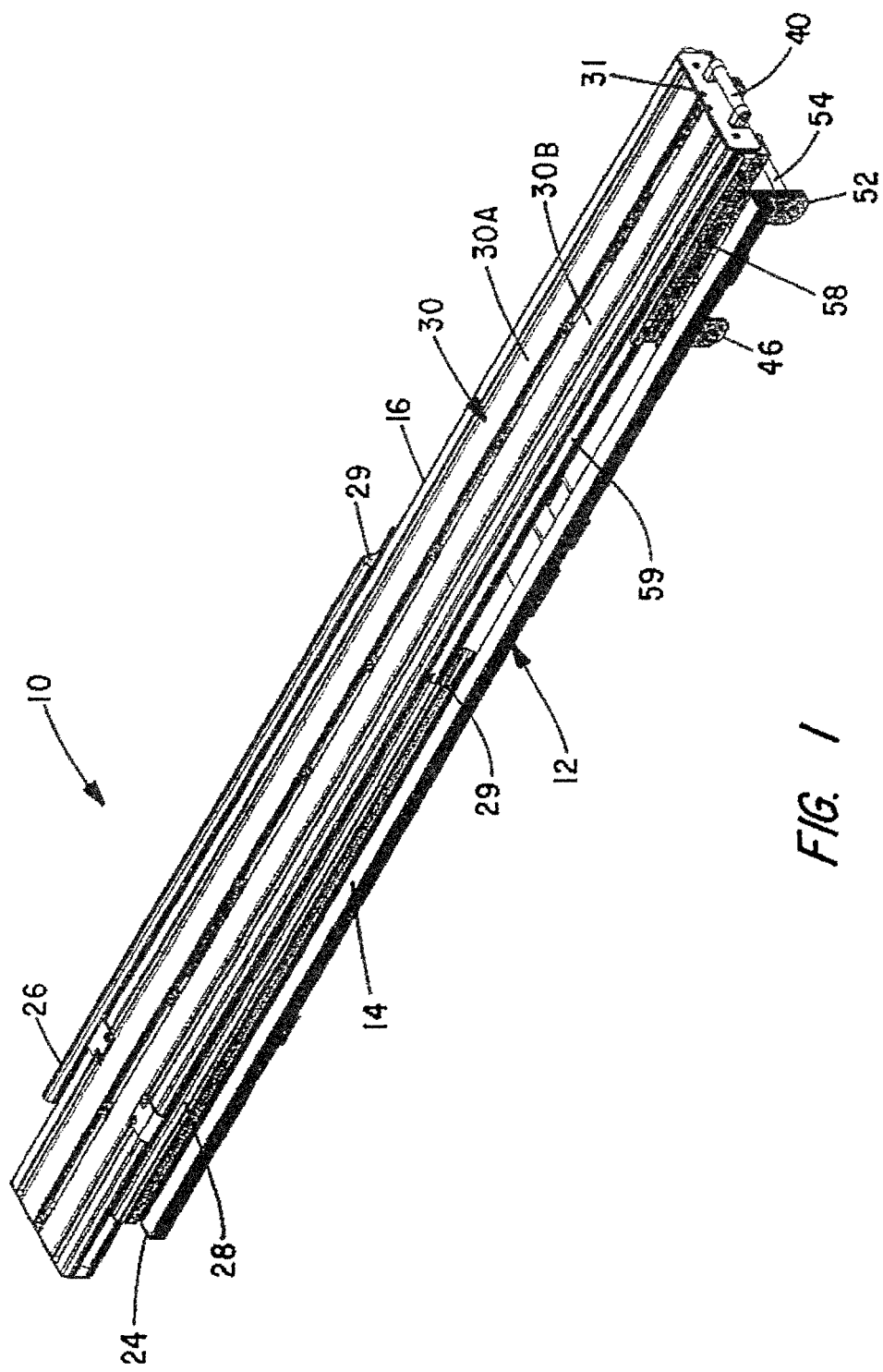
FIG. 1 is a general perspective view of the ladder rack of the present invention as it appears when positioned on a vehicle's roof.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", "forward", "rearward", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is shown a perspective view of the ladder rack 10 as it would be seen when disposed on the roof of a van or other type of work vehicle when in its load transporting position. It would preferably be aligned with the length dimension of the vehicle, but it is also possible to design the device to be aligned with the vehicle's width dimension. It is seen to comprise a stationary bed assembly 12 comprising a pair of side rails 14 and 16 that are held in parallel and spaced-apart relation by a plurality of flat metal plates as at 18, 20 and 22 in FIG. 3. The side rails 14 and 16 are preferably aluminum tubing of rectangular cross-section and, without limitation, may be about 100 inches in length for an embodiment where the assembly is aligned with a longitudinal direction of the vehicle. Means are provided for affixing the stationary bed to a work vehicle's roof.

Extending approximately halfway along the length of the side rails 14 and 16 from a front end 24 of the stationary bed 12 are metal guides 26 and 28 of a generally C-shaped cross-sectional contour. The rear ends of the metal guides are identified by numerals 29.

Figure 2:
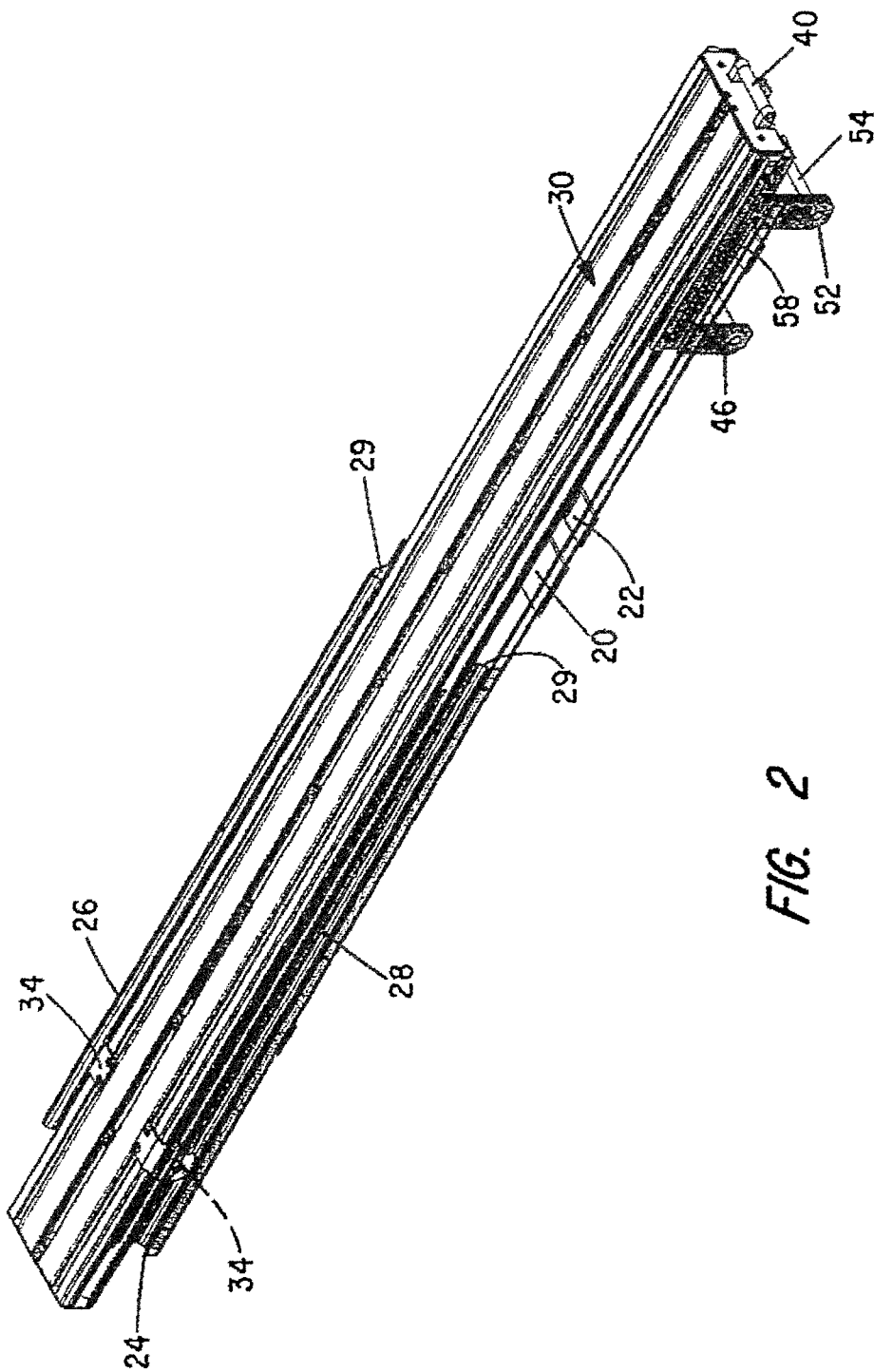
FIG. 2 is a view similar to FIG. 1, but showing the disposition of guide rollers within horizontal guide members on the stationary bed portion of the assembly.

Positioned atop the stationary bed assembly 12 is a load support member indicated generally by numeral 30. It comprises a pair of identical aluminum extrusions 30A and 30B held together by screw clamps as at 32 (see FIG. 7). As best seen in FIG. 2, attached to the side edges of the load support member 30, are guide rollers 34 that cooperate with the roller guides 26 and 28 to constrain the load support member 30 to generally horizontal travel over the lengths of the roller guides 26 and 28.

Also seen in FIG. 1 at the rear end 36 of the load support member is a spring-loaded latch handle 40. As will be further explained infra, the latch operated by the handle 40 serves to hold the load support member 30 in its fully forward or contracted position relative to the stationary bed assembly 12. The latch prevents movement of the load support member on the stationary bed, such as during travel of the vehicle to a job site.

Figure 3:
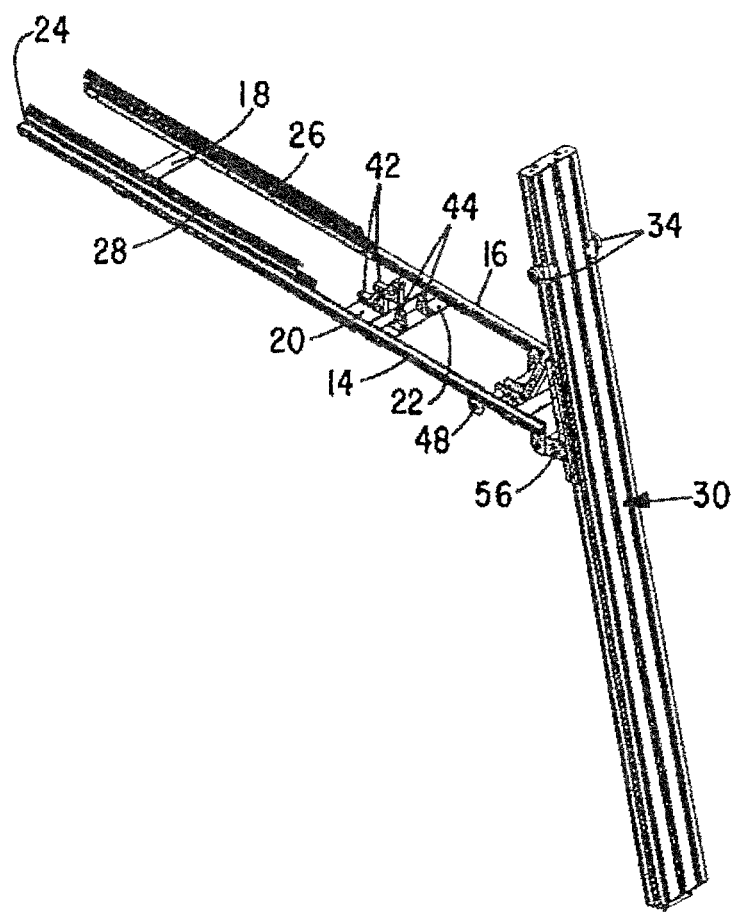
FIG. 3 is a perspective view illustrating the stationary bed that is adapted to be affixed to the roof of a work vehicle and with the load support member in its fully tilted position.
Figure 3A:
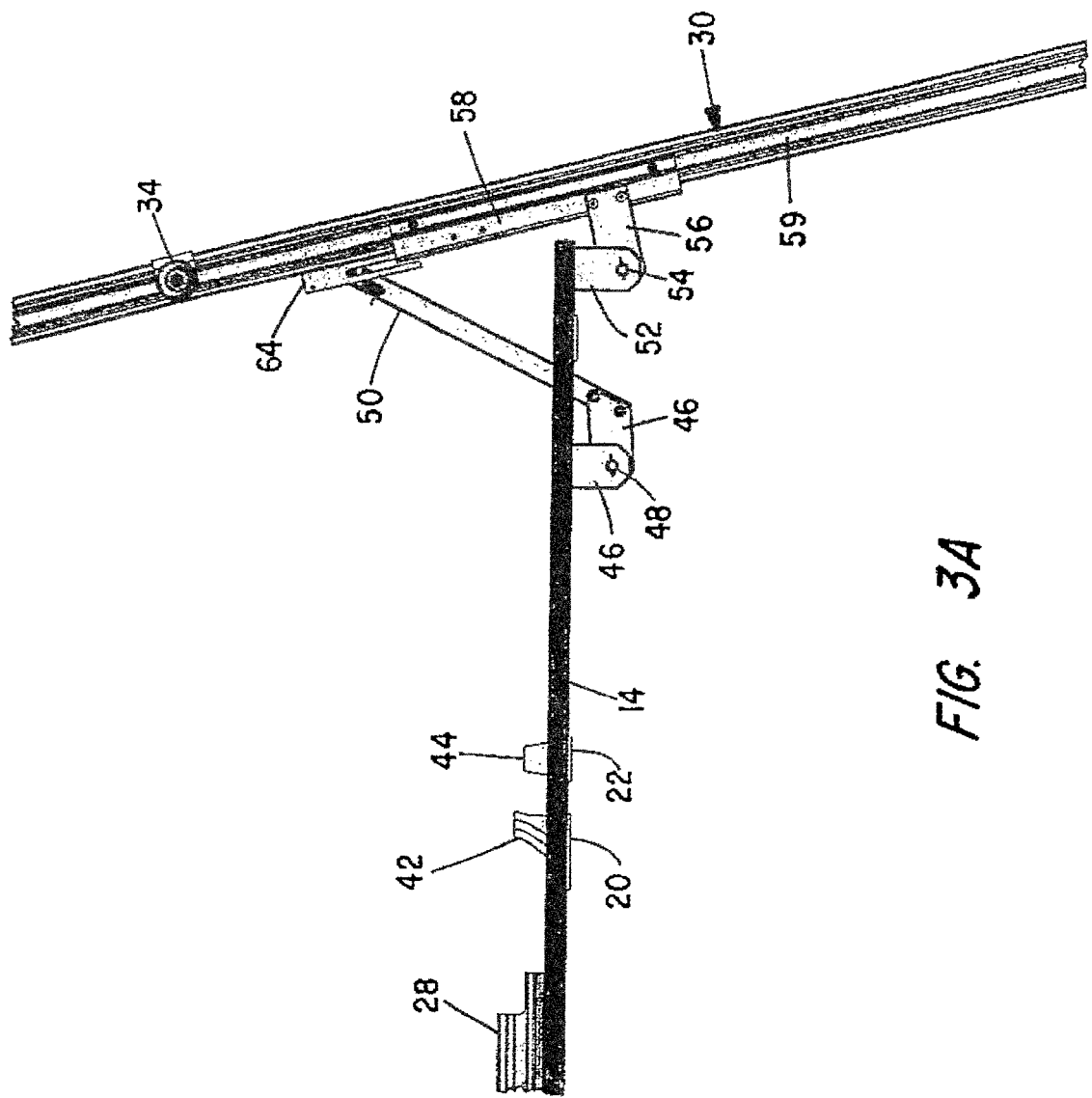
FIG. 3A is a side view thereof.
Figure 4:
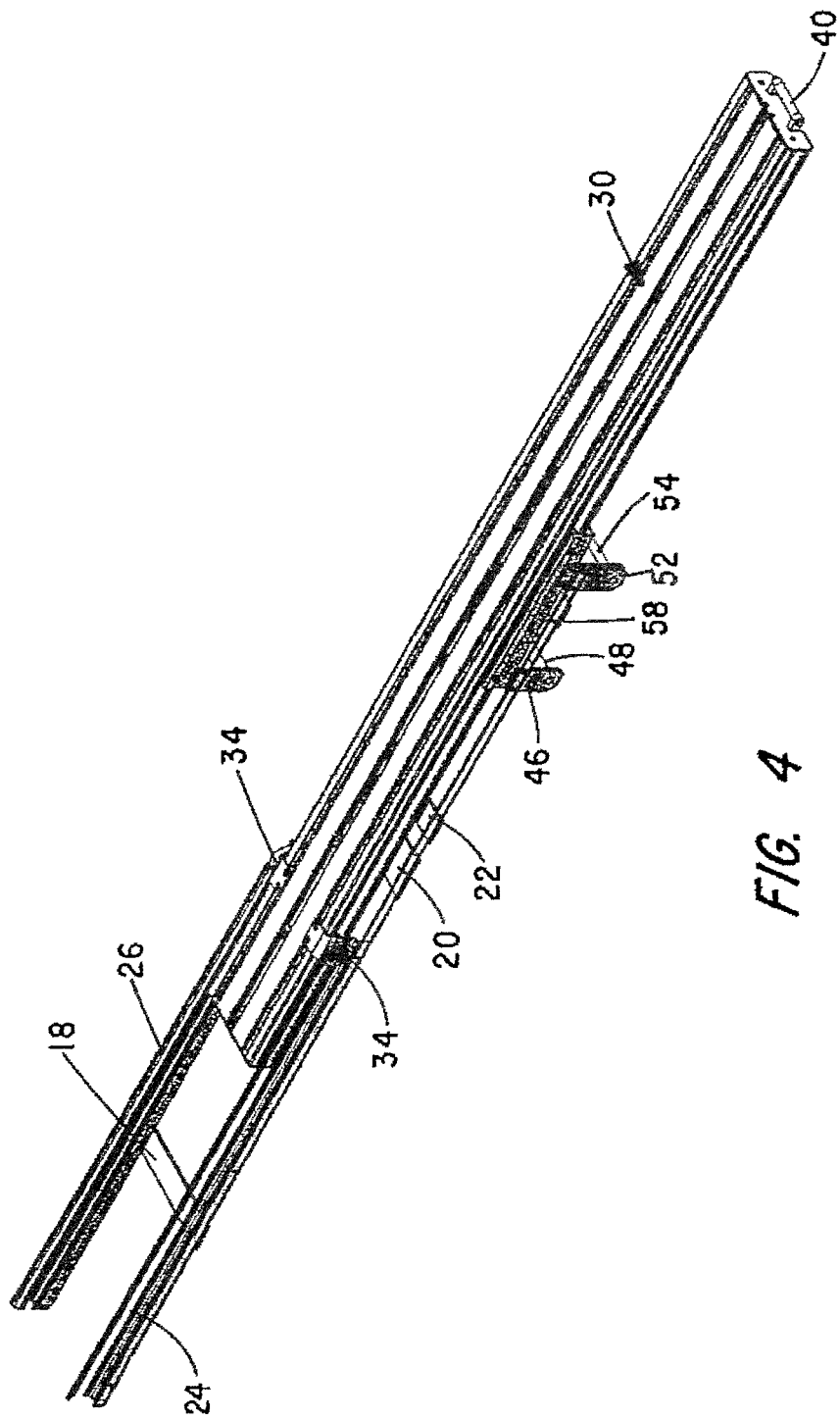
FIG. 4 is a perspective view of the ladder rack with the guide rollers just leaving the confines of the horizontal roller guides.

With reference to FIGS. 3 and 3A, affixed to and projecting upwardly from the metal plates 20 and 22, are camming surfaces 42 and 44, the functions of which will be further explained as this specification continues. Extending between brackets 46, affixed to the side rails 14 and 16 of the stationary bed assembly, is an axle member 48 supporting one end of a control arm 50 that is free to rotate on the axle member 48. Also affixed to the side rails 14 and 16 of the stationary bed assembly 12, are brackets 52 supporting an axle 54 on which a support arm 56 is rotatably secured.

Figure 10:
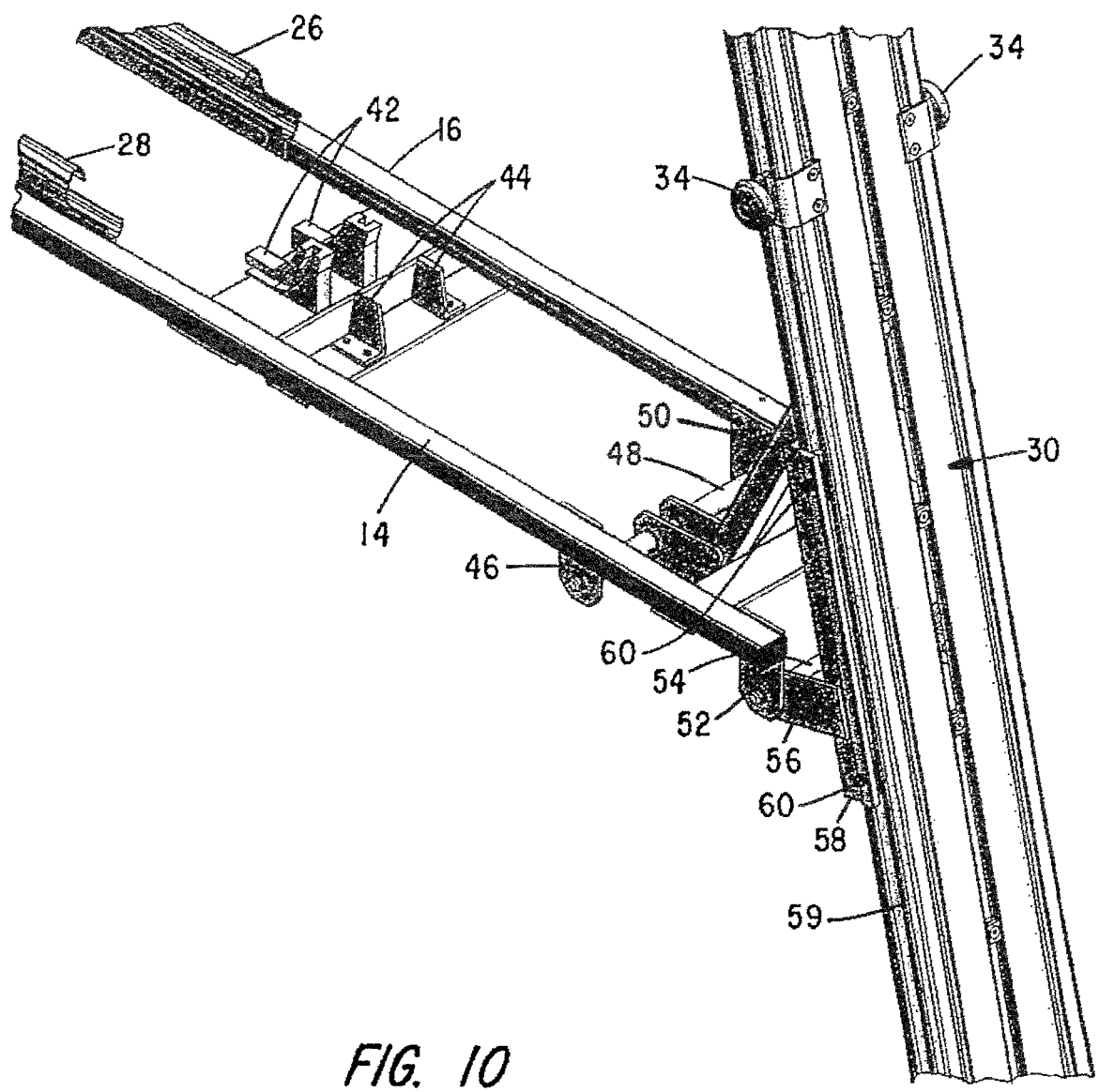
FIG. 10 is a detailed partial view of the load support member relative to the bed when the load support member is fully elevated.
Figure 11:
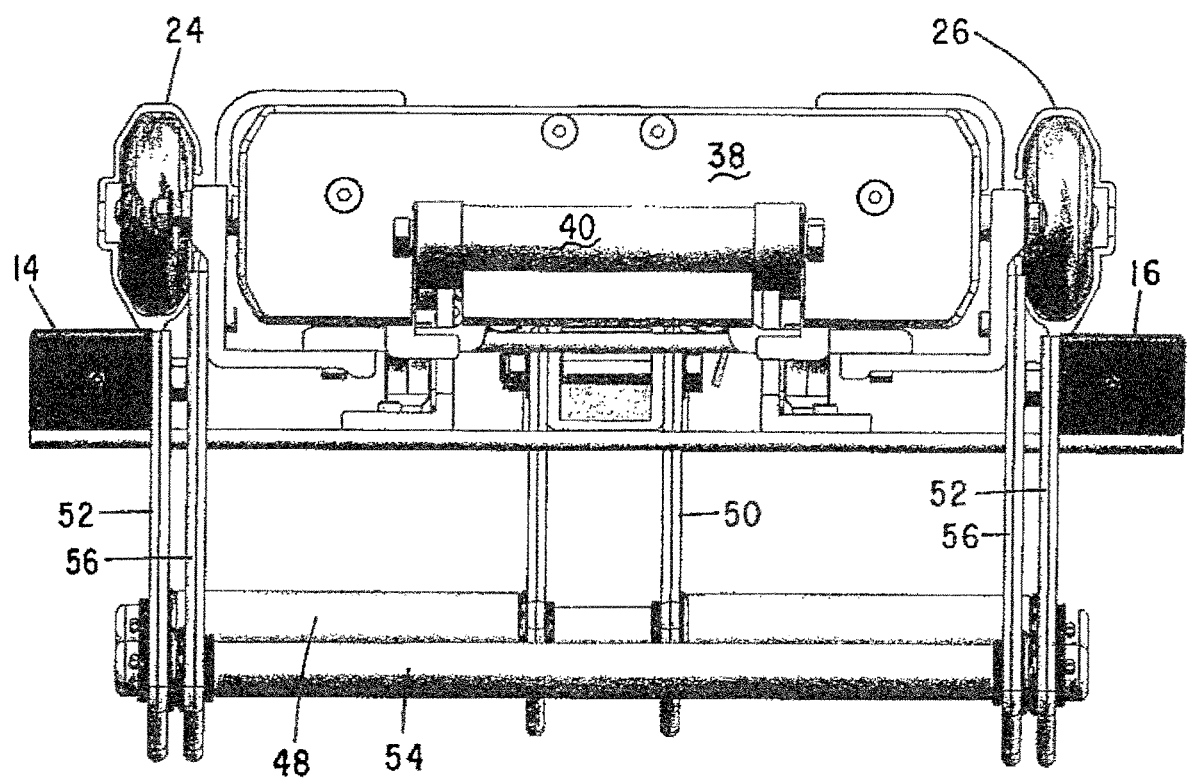
FIG. 11 is an end view of the ladder rack assembly showing a latching handle for maintaining the load support member stationary with respect to the stationary bed when the load support member is in its most forward position on a vehicle's roof.
Figure 12:
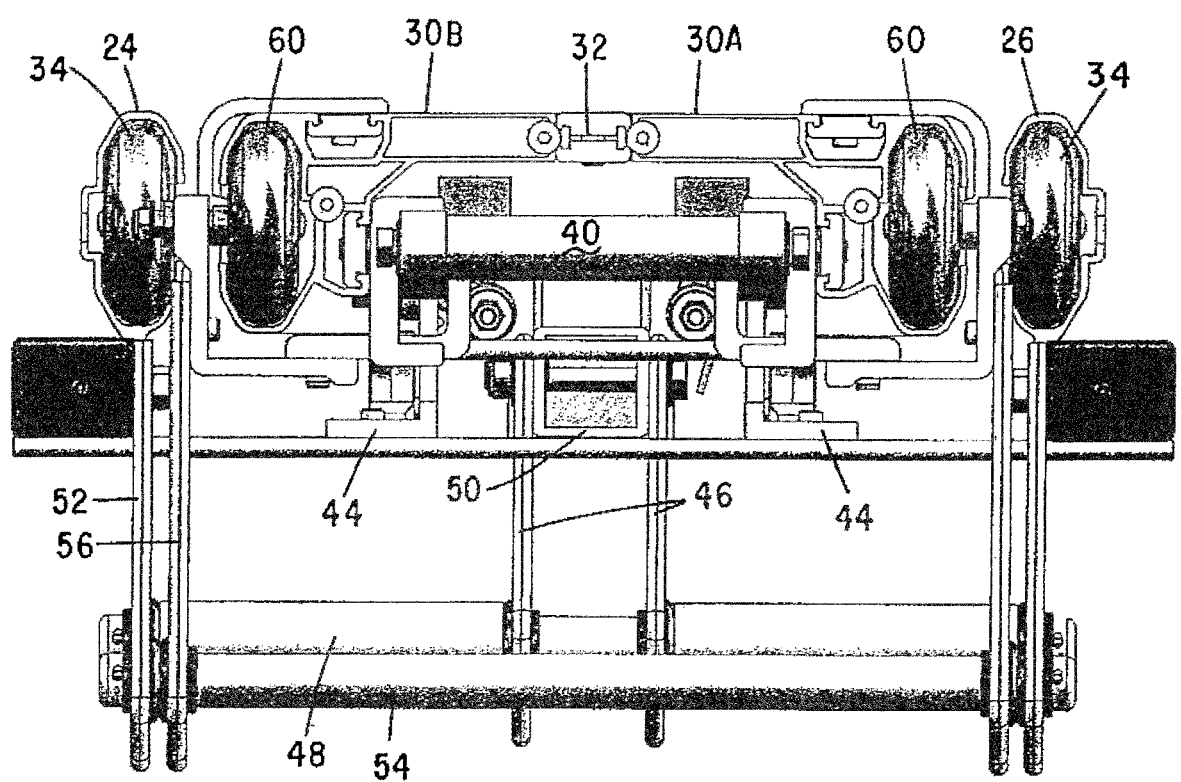
FIG. 12 is a view like FIG. 11, but with the cover plate removed.

As best seen in FIG. 10, journaled for rotation on the axle 54 supported by bracket 52, is the support arm 56. It is bolted to a slide plate 58 having rollers 60, as better seen in the end view of FIG. 12. The rollers 60 ride in longitudinally extending channels 59 (FIG. 10) formed in the side edges of the extrusions 30A and 30B of the load support member 30.

Figure 5A:
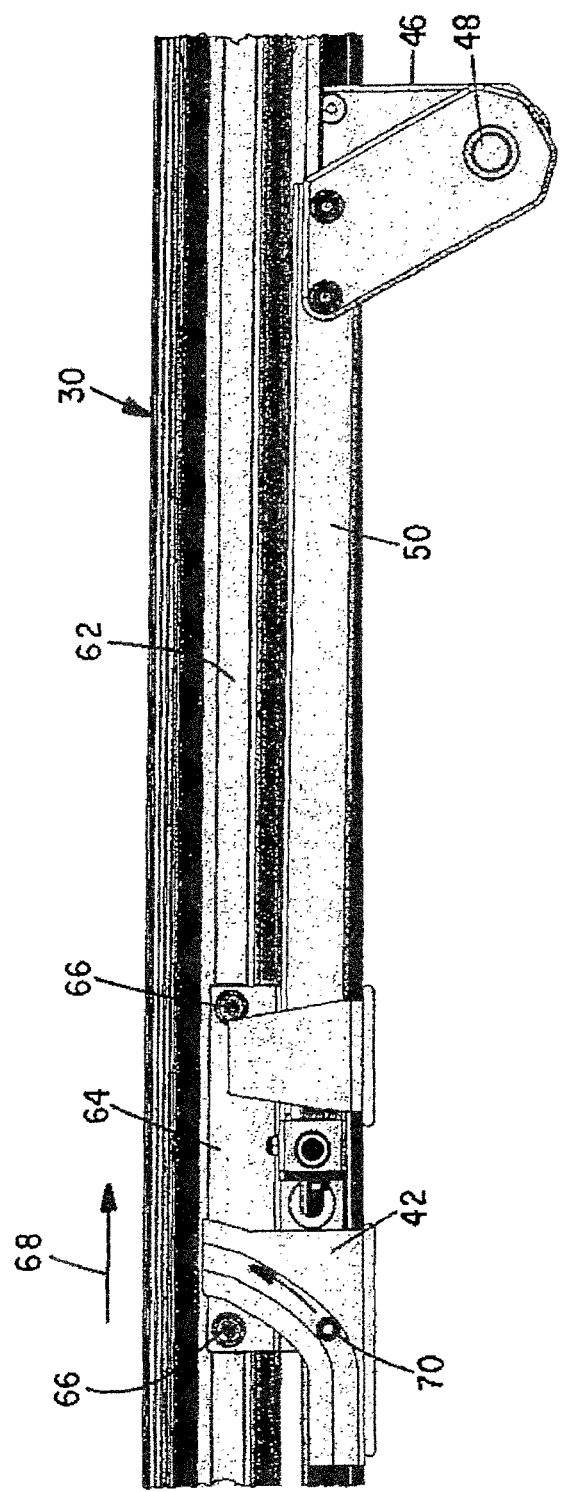
FIG. 5A is a detailed side view showing a cam follower roller affixed to the latch plate following the curvature of a first cam member to effect elevation of the load support member relative to the stationary bed.
Figure 5C:
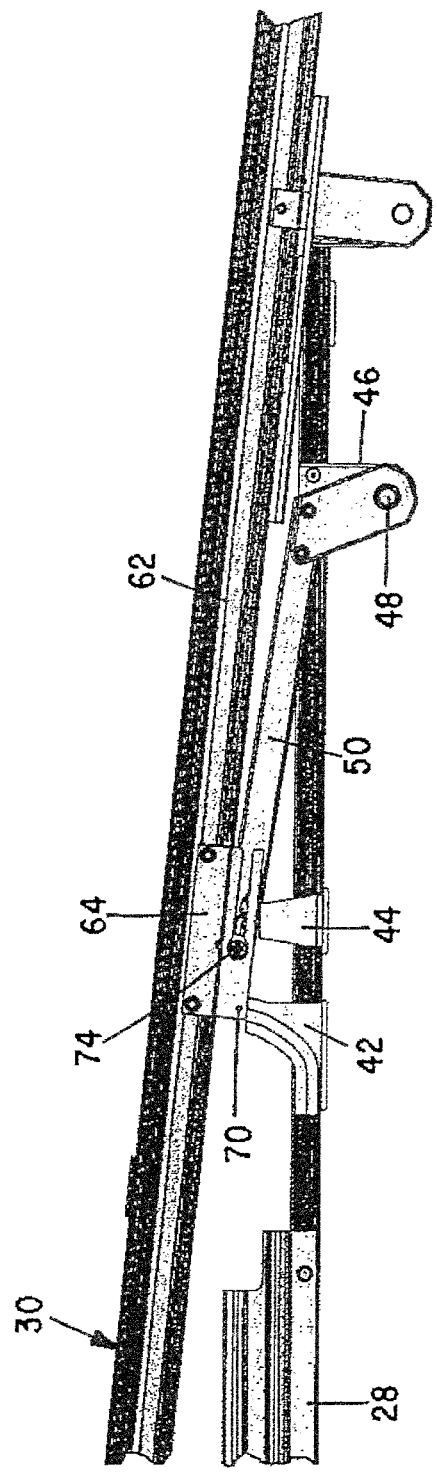
FIG. 5C is a detailed view of the ladder rack assembly where the control arm is locked to a latch plate on the load support member.
Figure 6:
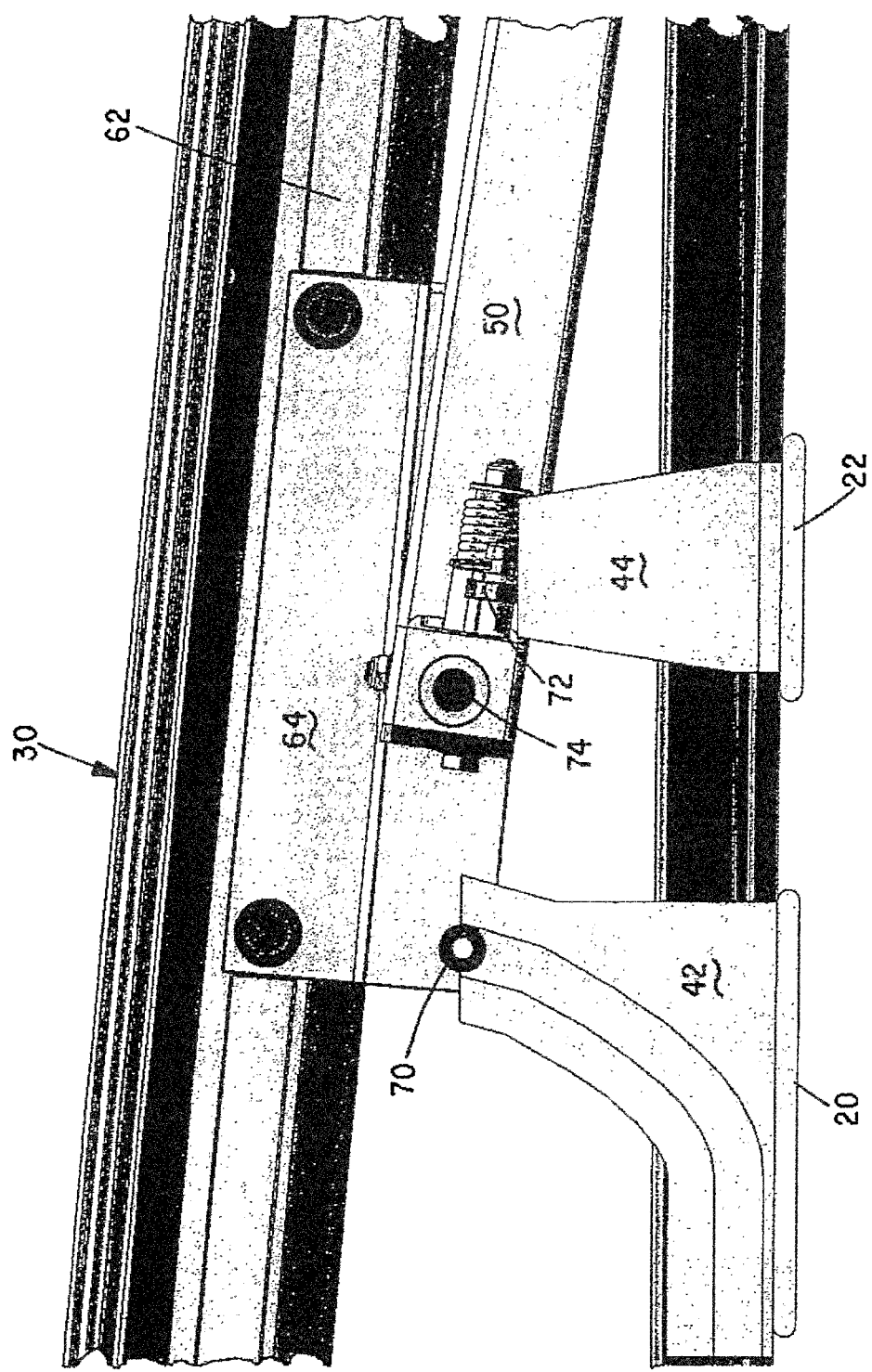
FIG. 6 is an enlarged view of the cam latching mechanism.

Also affixed to the bottom of the load support member 30 by means of clamping bolts disposed in a longitudinally extending groove 62 formed in the extrusions 30A and 30 B are latch plates 64 (FIG. 5A). Cam follower rollers journaled on the latch plates are identified by numeral 70. As the load support member 30 is moved to the right in the direction of the arrow 68 (FIG. 5A), a cam follower roller 70 affixed to the latch plate 64 will enter the arcuate groove as seen in the cam member 42. As it traverses the curved cam track surface, as shown in FIGS. 5A-5C, it will cause the load support member 30 to begin to tip or rotate clockwise. Then, as the cam follower roller 70 reaches the location shown in FIG. 5C and in FIG. 6, a latching cam follower 72 rides up on the cam surface 44 to cause a spring-biased latch pin 74 to extend from its housing block 78 (FIG. 7A) and engage the free end of the control arm 50 with the latch plate 64, as seen in FIG. 5C. The cam actuated latch pin assemblies affixed to a free end of control arm 50 is shown in greater detail in FIG. 7A.

Figure 8:
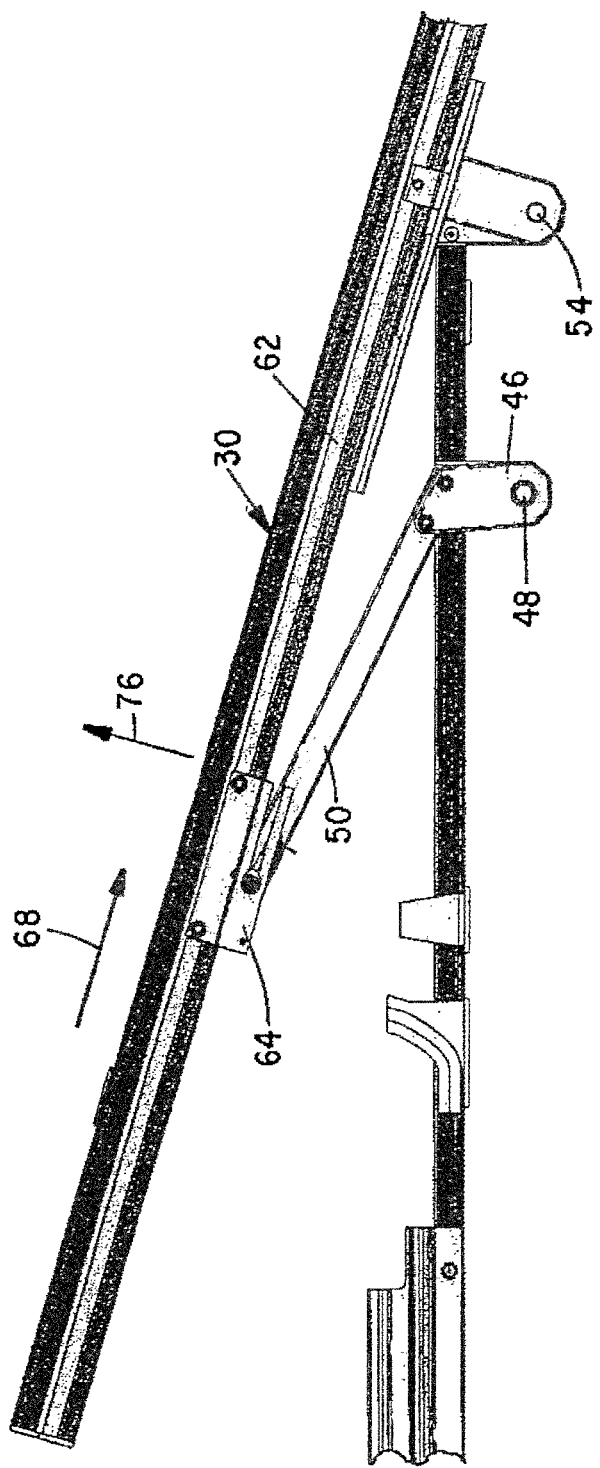
FIG. 8 is a side elevation view with a first half of the load support member removed to show the connection of the latch plate fastened to the load support member as the load support member is being moved to the right in the drawing.

As illustrated in FIG. 8, as the load support member 30 is drawn in the direction of the arrow 68, the control arm 50 will cause the load support member 30 to rise in the direction of the arrow 76 and will continue to rotate about the axle 54 until a point is reached, as shown in FIG. 3, where the load support member 30 assumes a disposition slightly inclined to the vertical.

Figure 7:
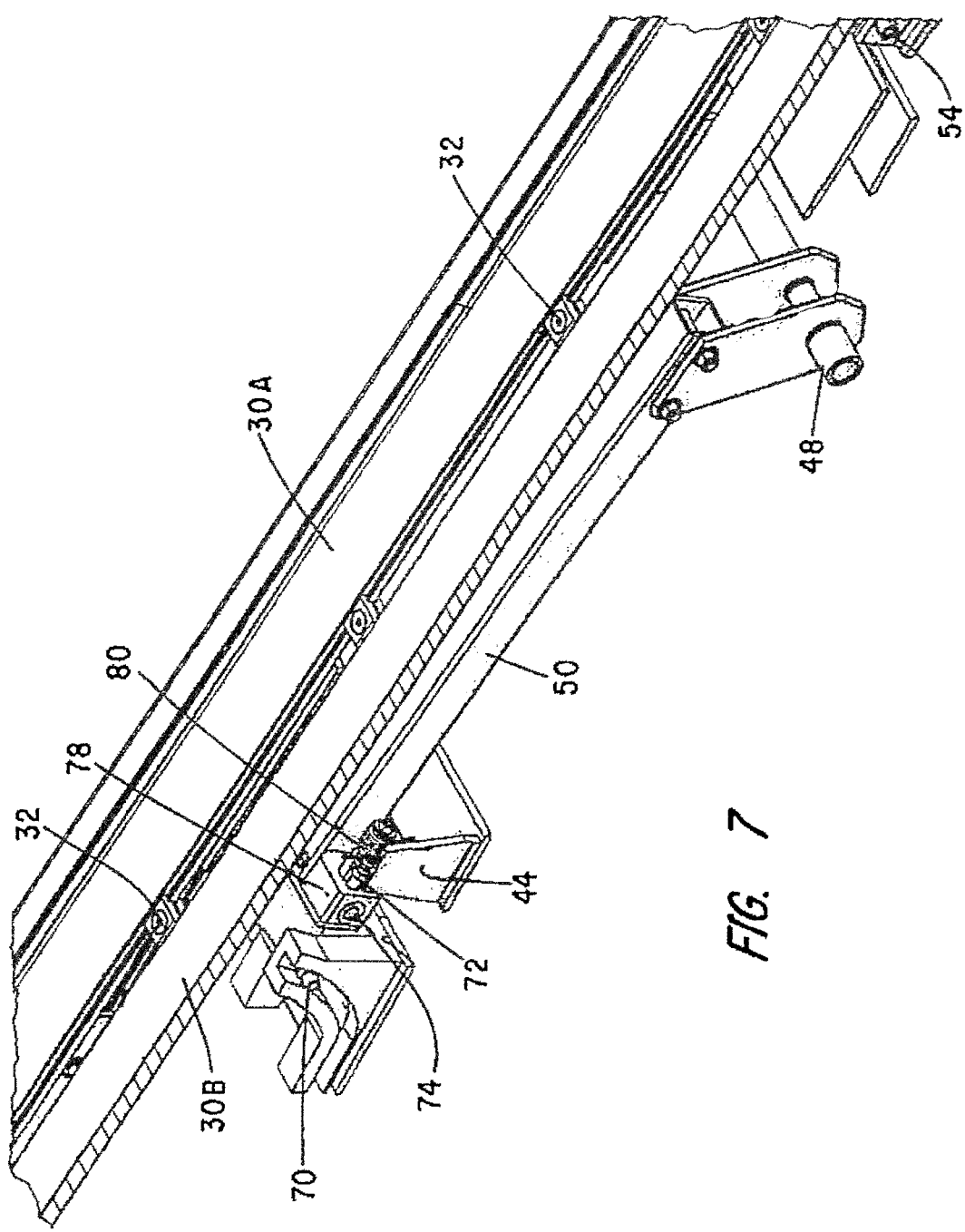
FIG. 7 is a further detailed view of the mechanism for locking the control arm to the load support member.
Figure 7A:
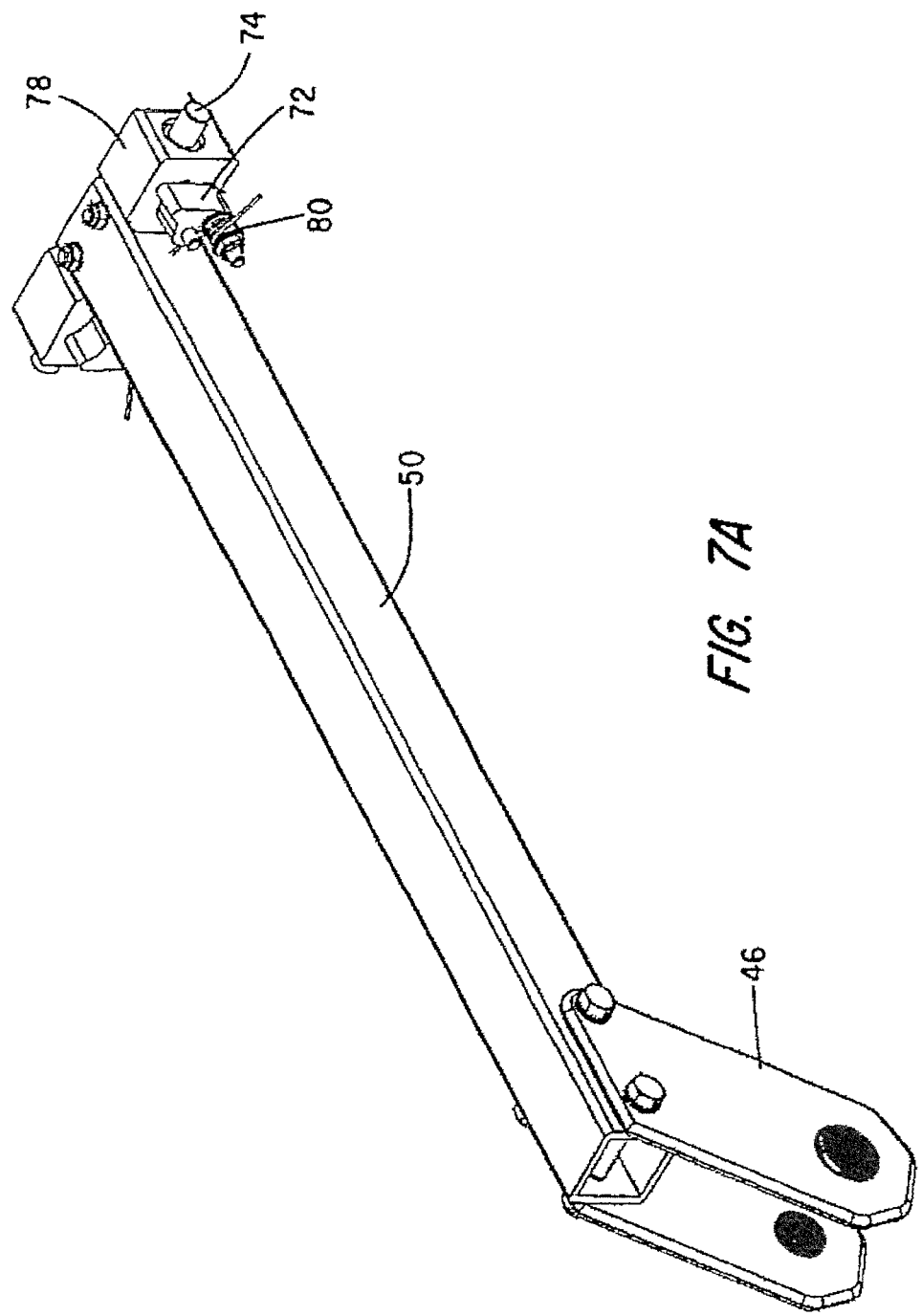
FIG. 7A is a detailed view of the control arm with cam-actuated latching pin assemblies attached to a free end thereof.

With reference to FIGS. 7 and 7A, the cam actuated latch pin 74 slides within a bore in the block 78 as the latching cam follower 72 is made to ride up on an arcuate surface of the cam 44. A return spring 80 is affixed to the assembly so as to again retract the pin from its latched condition with respect to the control arm 50 when the slide member 30 is elevated from the position shown in FIG. 3 to a horizontal disposition and pushed forward toward the leftmost end 24 of the stationary bed 12 to its stowed disposition.

As the load support member 30 rotates clockwise when viewed in FIG. 8, a point is reached where gravity takes over to cause the load support member to fall of its own weight. To prevent downward slamming of the load support member and the ladders being carried thereon, a dampener 71 is suitably fastened to the underside of the load support member 30. The dampener 71 is preferably of a type described in detail in currently pending U.S. patent application Ser. No. 62/512,814, filed May 31, 2017, the contents of which are hereby incorporated by reference. In it, a gas spring is combined with a damper in a single unitary body where the damper's output shaft is of an extended length.

Figure 9:
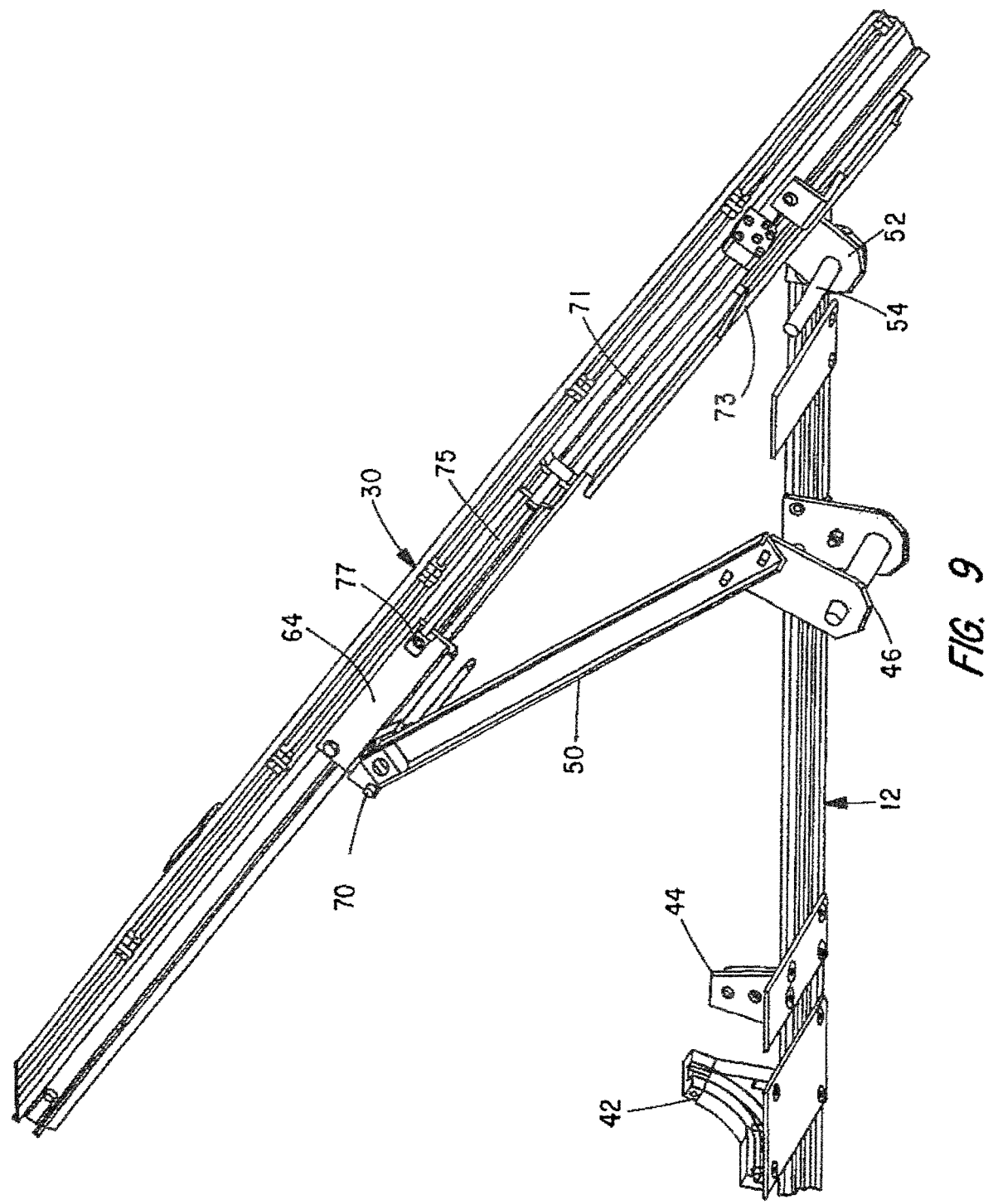
FIG. 9 is a partial side view of the ladder rack assembly where the load support member is partially elevated and showing the placement of a dampener used to slow the decent of the load support member as it moves to the vertical.

In FIG. 9, the dampener's unitary body is shown as being mounted on a plate 73 that is coupled to the brackets 52 on the stationary bed 12 and the damper's output shaft 75 is aligned with a block 77 bolted to the latch plate 64. During rearward movement and rotation of the load support member 30, as already described, the block 77 on latch plate 64 will press against the end of the damper output shaft 75 and will slow the descent of the load support member upon its reaching its over-center point of travel.

Figure 15:
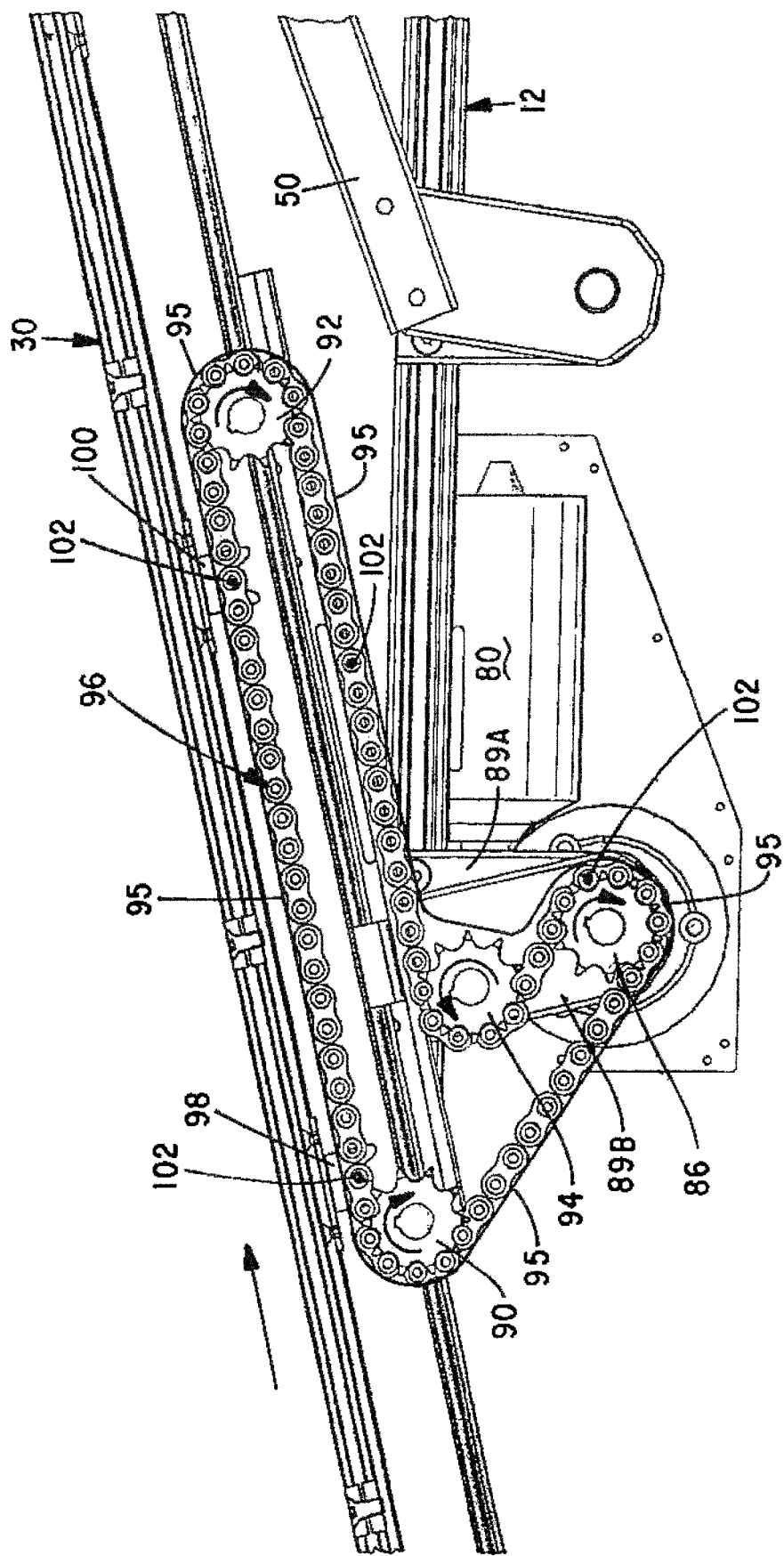
FIG. 15 is a further detailed view as the load support member is being driven.

FIGS. 13-16 are included to show how the manually-operated version of the ladder rack heretofore described can be operated automatically by the addition of a rotary-to-linear drive assembly. A DC motor 80 is contained within a motor housing 82 that is secured to one of the rails 14 or 16 of the stationary bed 12. The motor is connected in driving relation to a worm drive 84 (FIG. 14) having a drive sprocket 86 secured to its output shaft 88. The output shaft is journaled for rotation in two sets of parallel plates 89A and 89B one of which is affixed to the stationary rails 14 and 16 and the other of which is fastened to the slide plates 58. An endless chain is deployed about the drive sprocket 86 and about idler sprockets 90, 92, 94 to define a rectilinear flight 96 extending between the idler sprockets 90 and 92. Pins, as at 102 in FIG. 16, project laterally out from selected ones of the chain links that are a predetermined distance apart, as shown in FIG. 15.

Figure 13:
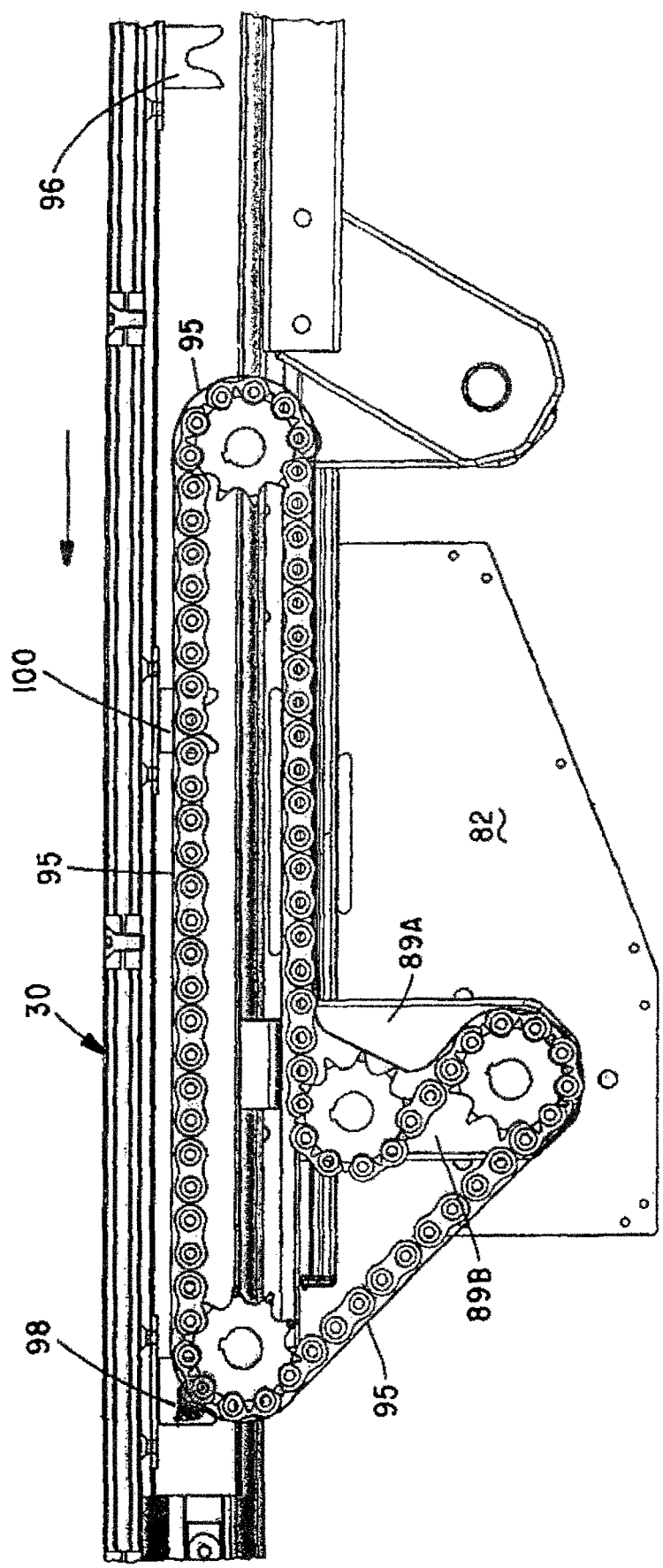
FIG. 13 is a side elevation view of a linear drive assembly installed on the ladder rack of the present invention.
Figure 14:
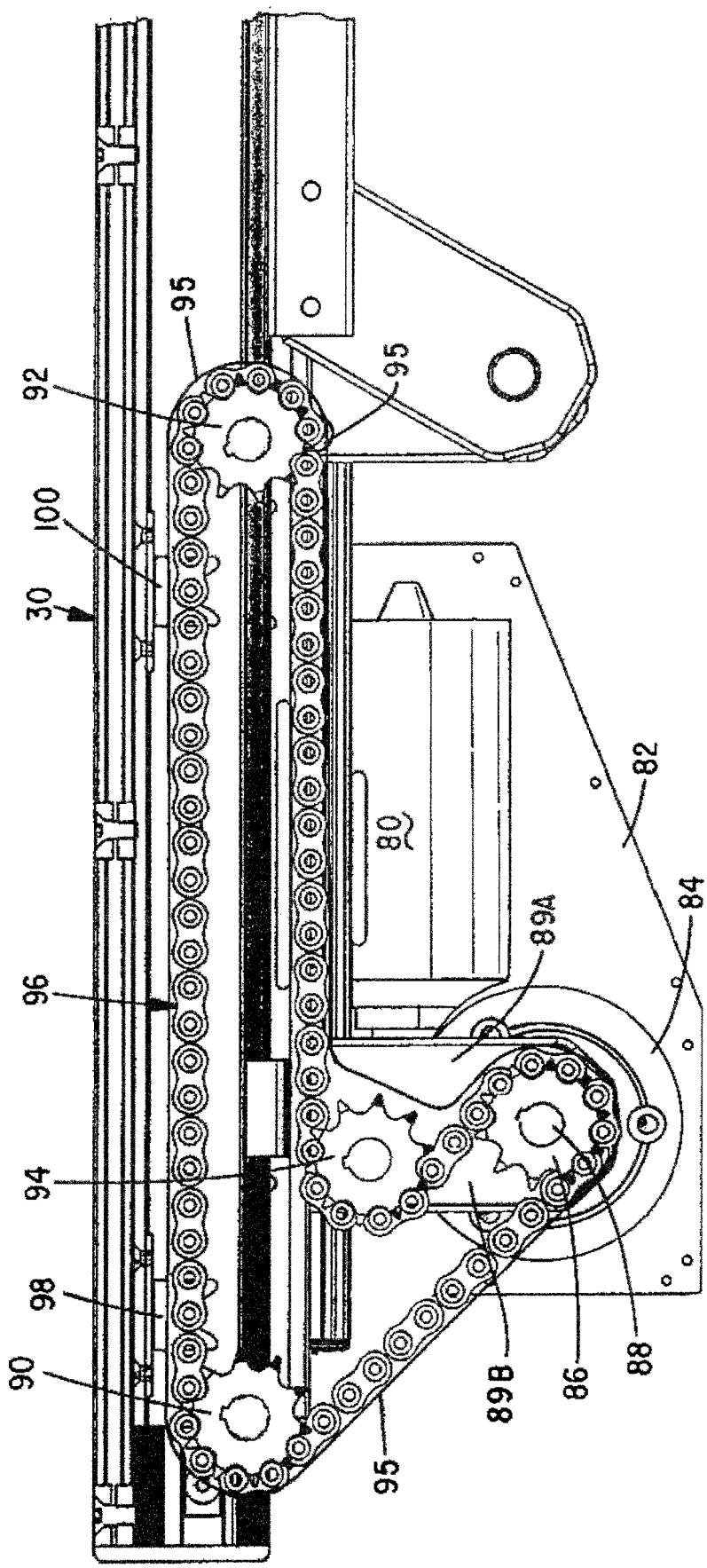
FIG. 14 is a view like FIG. 13, but with the motor housing removed to show the motor and its associated worm drive.
Figure 14A:
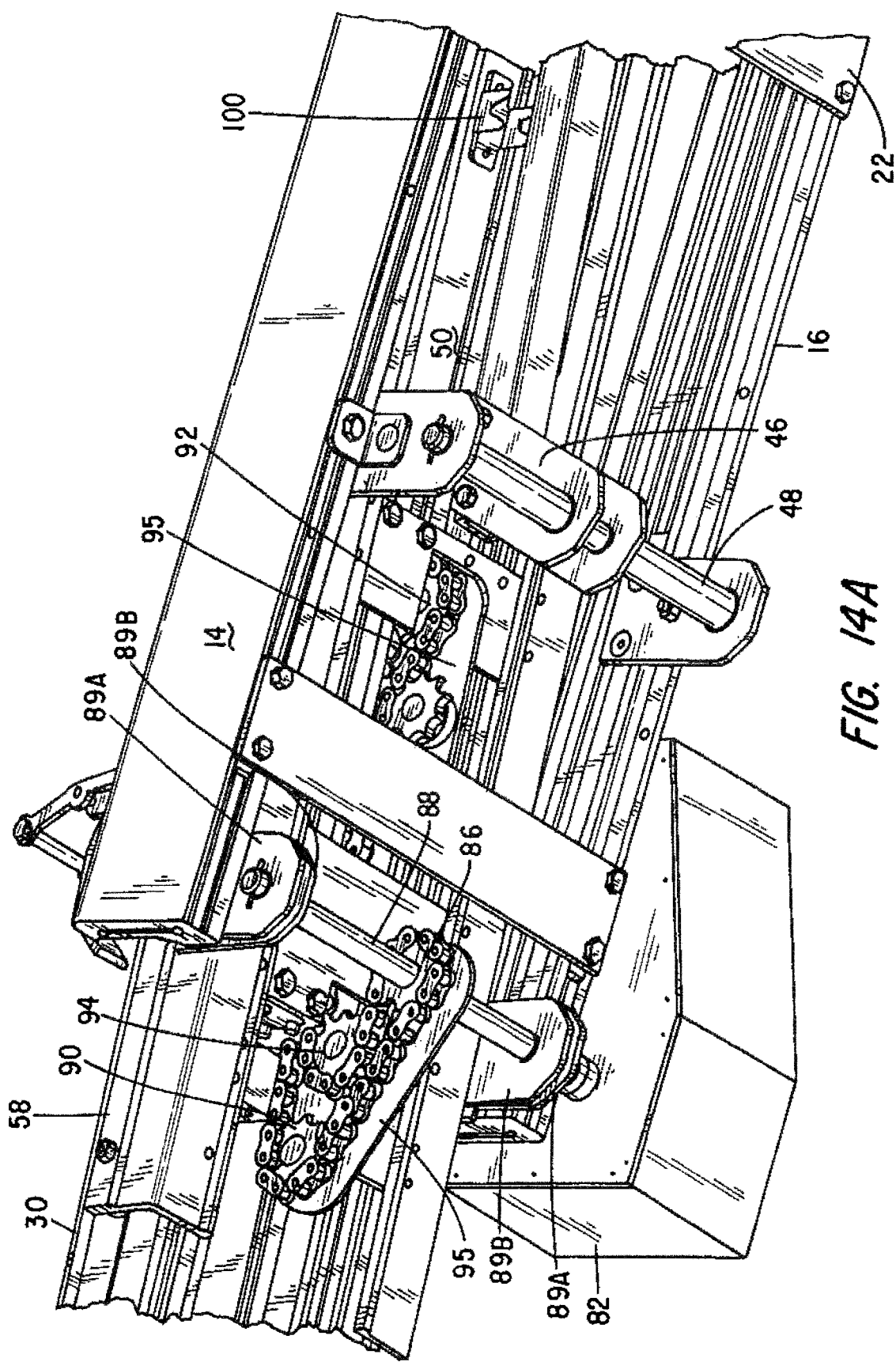
FIG. 14A is a partial perspective view from below of the motor drive mounted on the tiltable ladder rack.

Affixed to the underside of the load support member 30 at regularly-spaced intervals corresponding to the pin spacings on the chain are inverted U-shaped brackets, as at 96, 98, 100 in FIG. 13. As seen, the brackets include arcuate slots shaped to conform to the rollers on the chain links. Because the linear spacing between chain links carrying pins 102 is made the same as the linear spacing between slots of the brackets 96, 98 and 100 shown on FIG. 13, just as the pins on one link are about ready to disengage from the bracket in which it is then currently resident, as it traverses an idler roller 90 or 92, another of the brackets 96, 98 and 100 will become engaged with the pin 102 of a downstream chain link. As such, the movement of the chain about the drive sprocket 86 will smoothly and continuously translate the load support member 30 along the stationary bed 12 Because of the way that the sprocket wheels 90, 92 and 94 are journaled for rotation on a sprocket mounting plate 95 that is free to rotate about the output shaft 88 as its center as the load support member 30 pivots, the rectilinear chain flight 96 between the idler sprockets 90 and 92 remain parallel to the load support member 30 throughout its entire tilting motion in progressing from the ransport position atop the vehicle to the load/unload position at the rear of the vehicle and vice versa.

Without limitation, the motor 80 may be a one-half HP DC motor that can be powered by the battery of the vehicle on which the ladder rack of the present invention is mounted. A one-half HP motor will deliver about 250 inches-pounds of torque which is more than sufficient to drive the load support member through its path of travel in both directions when carrying a normal ladder load. The worm drive may turn the drive sprocket 86 at about 30 RPM such that the drive system can move the load support member from its fully stowed position atop the vehicle to its full tilted position behind the vehicle in approximately 30 seconds.

A pin 102 is made to extend from the sides of links. In a working prototype of the present invention, the pins 102 are placed through links on the chain at a 12.5 inch spacing and which thereby encompasses about 10 links. The brackets 96, 98, 100 are appropriately spaced so that they will be engaged by the laterally extending pins as the chain and the load support member move with respect to one another.

Figure 16:
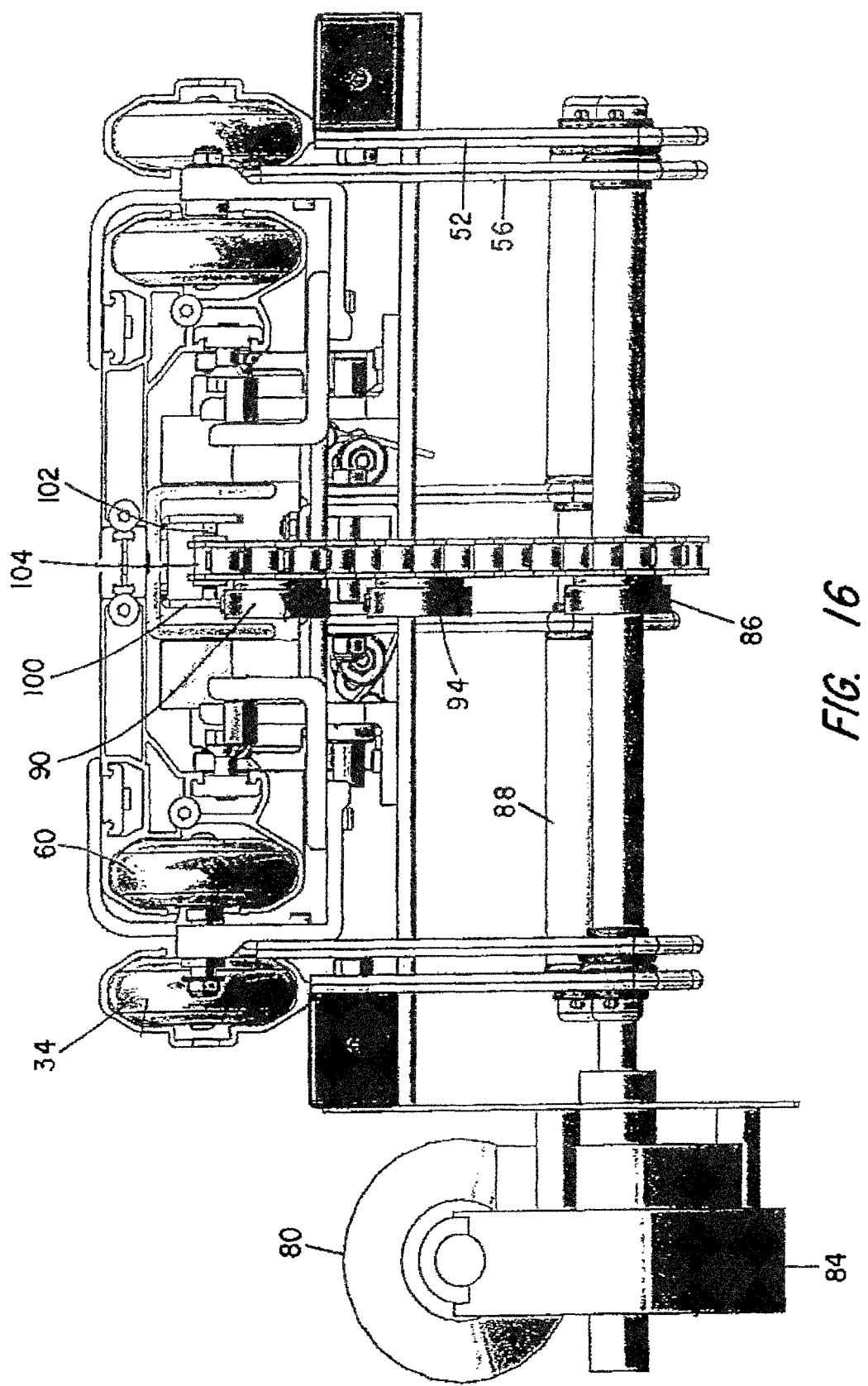
FIG. 16 is an end view of the ladder rack assembly of the present invention showing further detail of the motor drive and cam actuated latch used to engage and disengage the control arm from the load support member

FIG. 16 is included to show how a pin 102 extends through a link 104 and into a bracket such as 96, 98 or 100.

Figure 17A:
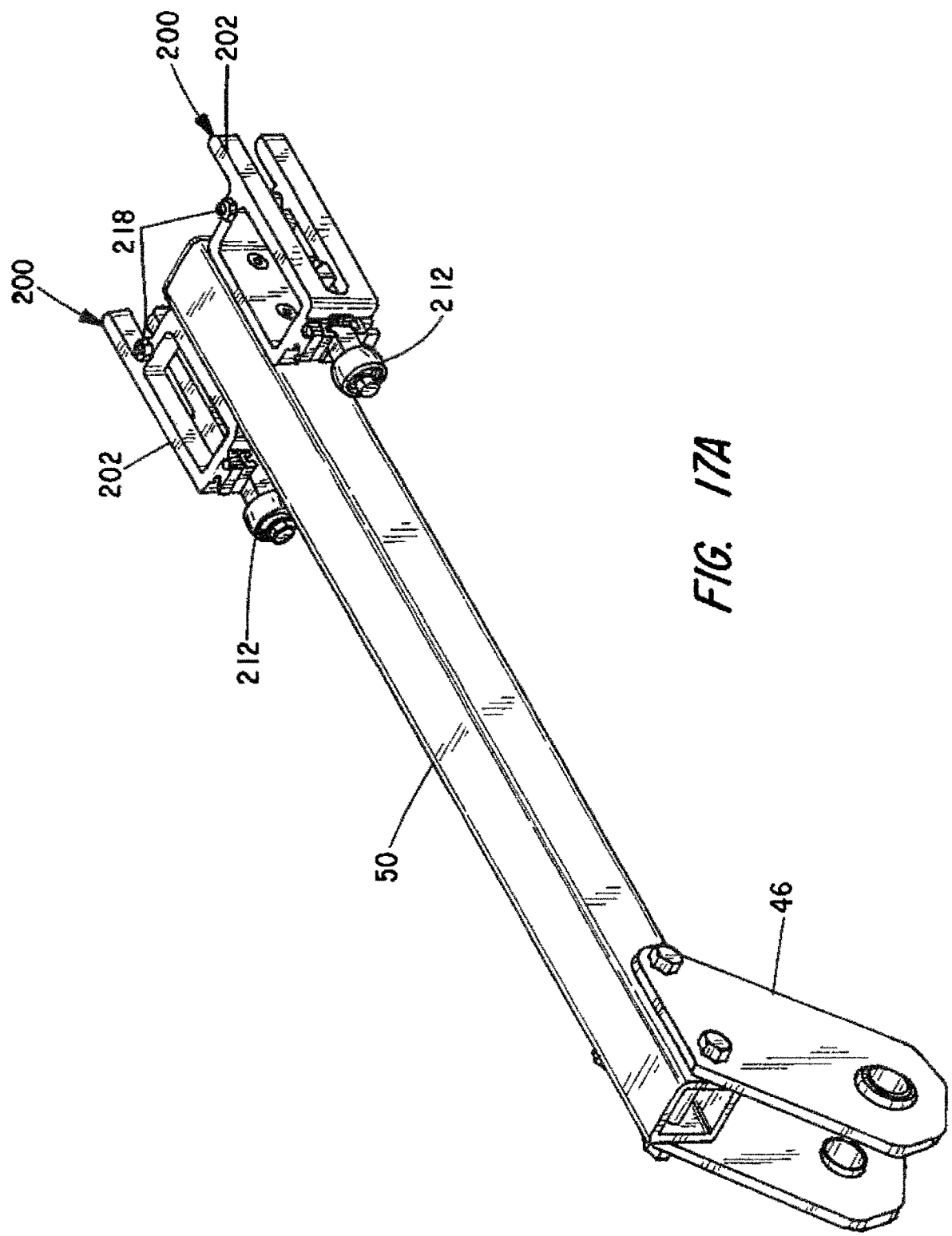
FIG. 17A is a perspective view of the control arm with an alternative embodiment of a latching mechanism attached.
Figure 17B:
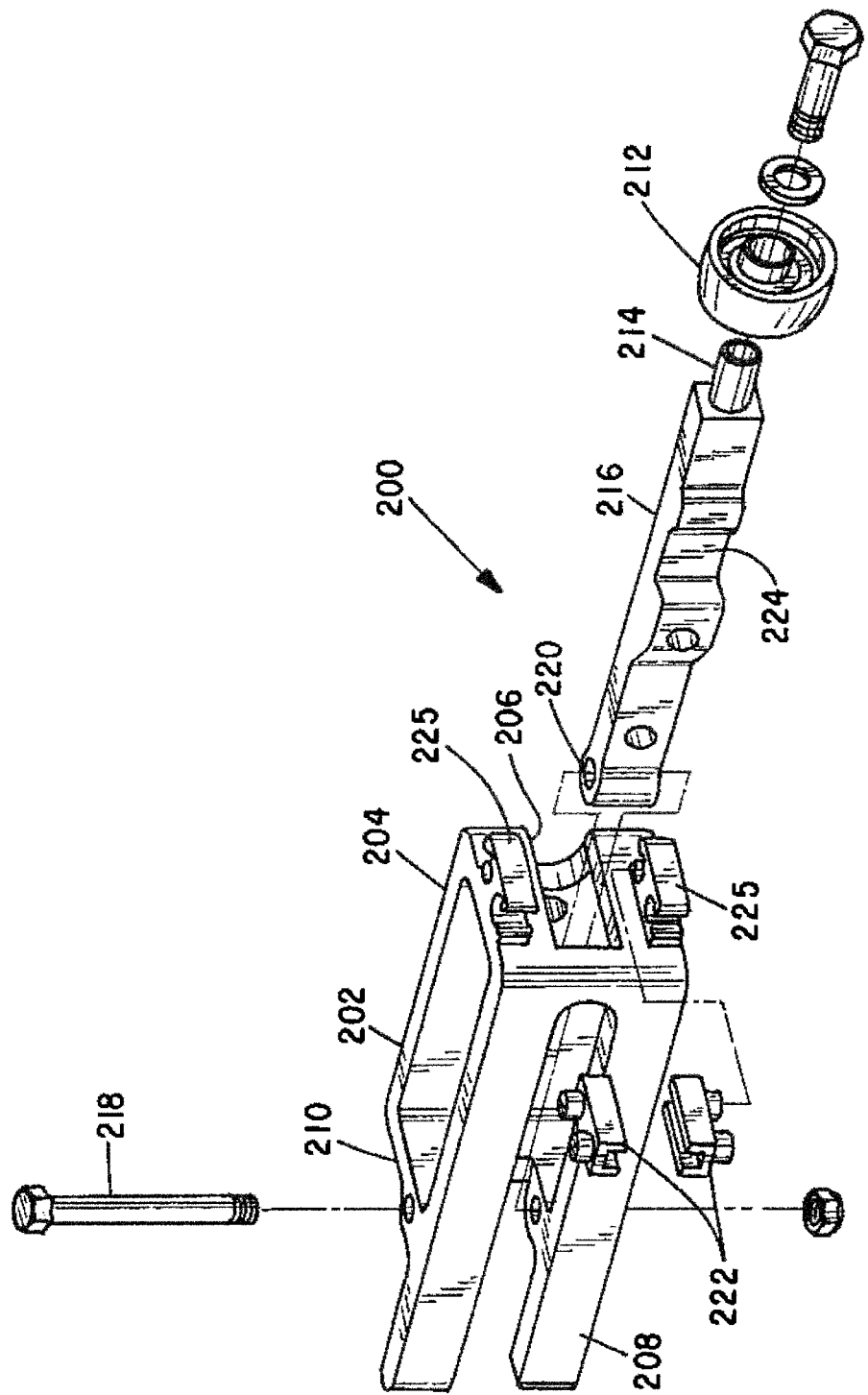
FIG. 17B is an exploded perspective view of the alternative latching mechanism.
Figure 18:
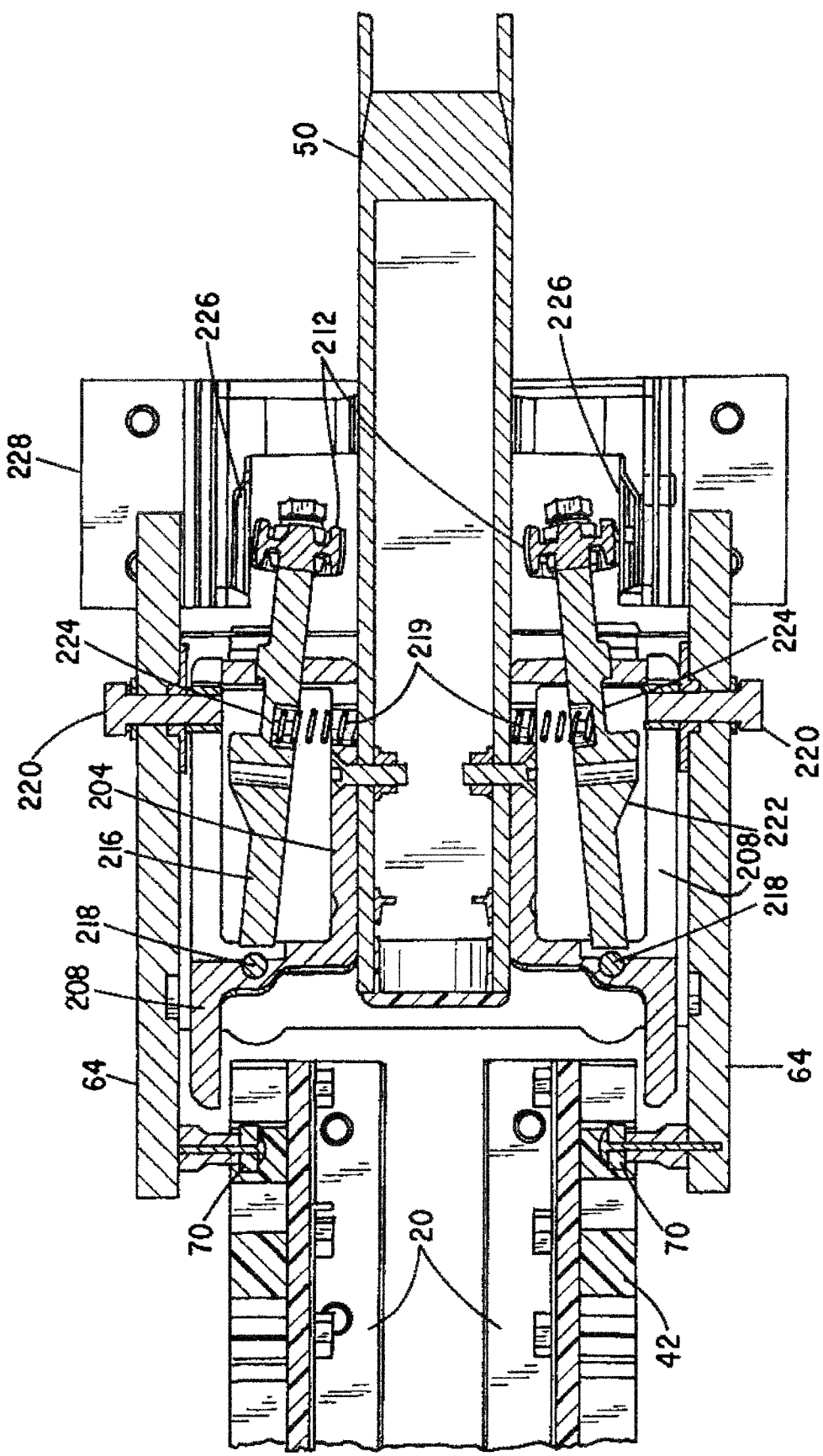
FIG. 18 is a cross section view of the alternative control arm latching mechanism at a location where coupling and uncoupling occurs when viewed from above.

An alternative and more robust mechanism for latching and unlatching the control arm 50 to the load support member 30 is shown in the views of FIGS. 17A and 17B and in the top cross section view of FIG. 18. Instead of employing the cam actuated spring biased latch pins as at 74 in FIG. 7A, fastened to the free end of the control arm 50 are arm lock assemblies that are indicated generally by numeral 200 in FIG. 17A. FIG. 17B is an exploded perspective view of the arm lock assembly 200 itself.

The arm lock assembly 200 is seen to comprise arm lock housings 202, each in the form of a rectangular tube having four mutually perpendicular walls 204, 206, 208 and 210 (FIG. 17B). The wall 206 is slotted, as are the walls 208 and 210.

A cam follower roller 212 fits onto one cylindrical end 214 of a latch arm member 216 that fits through the slot in the wall 206 and is hinged by a pin 218 that extends through aligned apertures in the wall 210 and through an aperture 220 in the end of the latch arm member 216. Slide bearings 222 fit into sockets on ears 225 that extend outward of the wall 206 and are made to sandwich the latch arm member 216 to reduce friction as the latch arm 216 is made to swing laterally about hinge pin 218 during use of the present invention. A compression spring 219 (FIG. 18) is placed between the wall 204 and the latch arm member 216 to normally bias the latch arm member 216 toward the slot in the wall 208.

With continued reference to FIG. 18, as the load support member 30 is moved from left to right in the drawings, a point is reached where the latch plate 64 supporting a cam follower roller 70 and an arm lock pin 220 causes the cam roller 70 to ride up the acceleration cam 42 and, as with the earlier described embodiment, causes the control arm 50 and the load support member 30 to begin to elevate. Simultaneously, the arm lock pin 220 moves into and along the slot in the wall 208 where it encounters the ramp 222 on the latch arm 216. This rotates the latch arm member about the pivot pin 218 against the force of the spring 219. Further rearward movement of the load support member 30 on the vehicle causes the notch 224 in the arm member 216 to engage the arm lock pin 220, thereby effectively latching the load support member 30 to the control arm 50. Thus, further displacement of the load support member will result in its being rotated about the axle 48 (FIG. 5C) to its vertical disposition at the rear of the vehicle, allowing a person standing on the ground to readily remove the load carried on the load support member 30.

Later, when it is desired to reload, say a ladder (not shown), onto the vehicle roof, it is secured to the load support member 30 and when the lower end of the load support member is lifted, either manually or by the above-described power unit, and advanced in a forward direction with the aid afforded by the gas spring 219 in dampener 71, a point is reached where control arm 50 swings down to a more horizontal disposition beneath the load support member 30 and, in doing so, it is guided between the guide members 228. The cam follower roller 212 on the arm member 216 of the arm lock assembly 200 now engages a cam surface 226 that extends downward from the guide member 228. The cam follower roller 212 rides down the cam surface 226 and, in doing so, the arm member 216 pivots against the biasing force of the compression spring 219 so that its notch 224 no longer is engaged with the arm lock pin 220. This decouples the control arm 50 from the load support member and permits the load support member to be advanced to its forward-most transport position on the vehicle's roof.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An apparatus for loading and unloading a load onto and from a roof of a vehicle comprising:
   a) a stationary bed adapted to be affixed to a roof of a vehicle, said stationary bed including a pair of rectilinear rails of a length corresponding to a length dimension of the vehicle's roof and held in parallel, spaced-apart relation by at least one transversely extending cross member;
   b) a pair of elongate guide members joined individually to the pair of rails and extending from a front end portion of the rails to rear ends of the guide members, the length of the guide members being less than the length of the rails;
   c) a load support member having guide rollers affixed thereto adapted to ride on the rails of the stationary bed, the rollers on the load support member cooperating with the guide members to constrain the load support member to translation motion along the rails without rotation until the guide rollers are able to exit the rear ends of the guide members;
   d) a control arm pivotally coupled at a first end to the stationary bed, a second end of the control arm being disconnected from the load support member when said guide rollers are constrained by the guide members and which become connected to the load support member following exit of the guide rollers from a rear end of the guide members during rearward displacement of the load support member along the rails of the stationary bed whereby the load support member is forced to rotate upward from a horizontal disposition;
   e) a pair of roller-mounted slides affixed to the opposed side edges of the load support member, the roller-mounted slides being pivotally coupled to rear end portions of the pair of rails of the stationary bed whereby the load support member may be simultaneously translated with respect to the pair of roller-mounted slides and rotated once the guide rollers disengage from the rear ends of the guide members wherein the length of the guide members is such that the load support member will not come into contact with the roof of the vehicle in moving from the vehicle roof to a position aligned with a rear end of the vehicle.

2. The apparatus of claim 1 and further including first and second cam surfaces connected to and disposed between the pair of rectangular rails; a cam follower roller for engaging the first cam surface to initiate rotation of the control arm and load support member during rearward displacement of the load support member and a cam actuated latch pin assembly affixed to the control arm for locking the control arm to the load support member upon disengagement of the cam actuated latch pin assembly from the second cam surface.

3. The apparatus of claim 2 wherein the cam actuated latch pin assembly releases connection of the control arm from the load support member upon engagement of the cam actuated latch pin assembly with the second cam surface during forward displacement of the load support member.

4. The apparatus of claim 1 wherein the load support member comprises a pair of elongated extrusions clamped to one another in side-by-side relationship.

5. The apparatus of claim 1 wherein the elongated guide members have a C-shaped cross-section and sized to allow the guide rollers to ride therein.

6. The apparatus of claim 5 wherein the elongated guide members are about one-half of the length of the rectilinear rails.

7. An apparatus for loading and unloading a load member onto and from a roof of a work vehicle comprising:
   a) a stationary bed adapted to be fixedly attached to a vehicle's roof;
   b) an elongate, rectilinear, load support member having opposed side edges;

c) slide plate members pivotally coupled to the stationary bed and joined to the opposed side edges of the load support member such that the load support member can slide with respect to the slide plate members; and d) a control arm pivotally joined at one end to the stationary bed and an opposed end of the control arm being uncoupled from the load support member when the load support member is in a stowed position atop the work vehicle and becoming coupled to the load support member during rearward movement with respect to the work vehicle of the load support member on the stationary bed, whereby continued rearward movement of the load support member results in rotation of the load support member from a horizontal orientation to an inclined orientation with respect to the stationary bed.

8. The apparatus of claim 7 wherein the stationary bed comprises a pair of elongate, rectilinear rails held in parallel, spaced-apart relation, each with first and second opposed ends; and a pair of elongate guide members affixed individually to said rails and extending from proximate the first ends toward, but short of, the second ends of said rails.

9. The apparatus of claim 8 wherein the load support member includes at least first and second rollers affixed for rotation on the opposed side edges of the load support member which, when engaging both the pair of rails of the stationary bed and the pair of guide members, allow only translational motion of the load support member on the stationary bed.

10. The apparatus of claim 9 wherein the load support member becomes free to both translate and rotate with respect to the stationary bed when the first and second rollers only engage the pair of rails and not the pair of guide members.

11. The apparatus of claim 7 further including:
at least one latch plate affixed to an underside of the load support member at a predetermined location along a length dimension of the load support member, said latch plate having a cam follower roller journaled for rotation thereon; and
a cam lock assembly affixed to said opposed end of the control arm for engaging the latch plate during the rearward movement of the load support member.

12. The apparatus of claim 11 wherein the cam lock assembly comprises:
a) at least one cam lock housing having four mutually perpendicular walls, a first of said walls attached to the opposed end of the control arm with the remaining three walls being slotted;
b) a latch arm member having first and second ends with a ramp surface and a notch located between the first and second ends, the first end being pivotally mounted in the slot of the second wall and the latch arm member extending out from the cam lock housing by way of the slot in the third wall located opposite from the second wall and a cam follower affixed to the second end of the latch arm member; and
c) a compression spring positioned between the first of said walls and the latch arm member for biasing the latch arm member toward the slot in the fourth wall whereby the ramp surface and the notch are accessible by a latch pin affixed to and projecting inward from the latch plate through the slot in the fourth wall.

13. The apparatus of claim 11 further including first and second cams affixed to the stationary bed, the first cam including an arcuate cam track adapted to receive the cam follower roller therein during the rearward movement of the load support member to thereby initiate rotation of the control arm and the second cam adapted to actuate the cam lock assembly.

14. The apparatus of claim 13 further including a hydraulic dampener with a body member affixed to the stationary bed and an output shaft adapted to engage the latch plate at a predetermined point during rearward movement of the load support member.

15. The apparatus of claim 8 further including a motor powered rotary-to-linear drive mechanism pivotally mounted between the rails of the stationary bed for imparting reciprocal motion to the load support member.

16. The apparatus of claim 15 wherein the rotary to linear drive mechanism comprises:
a motor disposed in a housing;
a drive sprocket mounted on a drive shaft, the drive shaft being journaled for rotation on a sprocket mounting plate and driven by the motor, the sprocket mounting plate being coupled to the slide plate members and rotatable about the drive shaft;
a plurality of idler sprockets journaled for rotation on the sprocket mounting plate;
an endless chain comprising a plurality of links surrounding said drive sprocket and said plurality of idler sprockets where at least two of said idler sprockets are mounted on said sprocket mounting plate to define a rectilinear flight extending parallel and adjacent to the underside of the load support members; and
a plurality of regularly spaced brackets affixed to the underside of the load support member, each of the brackets including a slot having an open end and where selected ones of said links of the chain have laterally extending pins where the length of chain between adjacent pins corresponds to the distance between the slots on adjacent ones of said plurality of brackets such that, as the chain is being driven, one of the pins will enter the slot on one of the plurality of brackets as another of the pins exits the slot on another of the plurality of brackets.

* * * * *